(12) United States Patent
Costello et al.

(10) Patent No.: US 11,601,304 B2
(45) Date of Patent: Mar. 7, 2023

(54) BLOCKCHAIN BASED VEHICLE CONTROL

(71) Applicants: Rolls-Royce Corporation, Indianapolis, IN (US); Rolls-Royce North American Technologies Inc., Indianapolis, IN (US)

(72) Inventors: John J. Costello, Indianapolis, IN (US); Richard J. Skertic, Carmel, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 527 days.

(21) Appl. No.: 16/687,885

(22) Filed: Nov. 19, 2019

(65) Prior Publication Data

US 2020/0200090 A1 Jun. 25, 2020

Related U.S. Application Data

(60) Provisional application No. 62/785,601, filed on Dec. 27, 2018, provisional application No. 62/783,017,
(Continued)

(51) Int. Cl.
*H04L 29/06* (2006.01)
*H04L 12/437* (2006.01)
(Continued)

(52) U.S. Cl.
CPC ............ *H04L 12/437* (2013.01); *B64D 31/06* (2013.01); *F02C 7/26* (2013.01); *G05B 19/0425* (2013.01);
(Continued)

(58) Field of Classification Search
CPC ......... H04L 12/437; H04L 9/006; H04L 9/06; H04L 9/0618; H04L 9/0637;
(Continued)

(56) References Cited

U.S. PATENT DOCUMENTS

| 7,831,827 B2 | 11/2010 | Walmsley |
| 8,233,620 B2 | 7/2012 | Dupaquis |

(Continued)

FOREIGN PATENT DOCUMENTS

| EP | 3 361 229 A2 | 8/2018 |
| WO | 2010126647 A2 | 11/2010 |
| WO | WO 2018/162628 A1 | 9/2018 |

OTHER PUBLICATIONS

Dejan Vujičić et al., Blockchain Technology, Bitcoin, and Ethereum: A Brief Overview, 2018 17th International Symposium (INFOTEH), East Sarajevo, Apr. 2018 (year: 2018), pp. 1-7, Faculty of Technical Sciences in Čačak, University of Kragujevac, Čačak, Serbia.

*Primary Examiner* — Malcolm Cribbs
(74) *Attorney, Agent, or Firm* — Crowell & Moring LLP

(57) ABSTRACT

A vehicle control method of starting and shutting down an engine, in which a processor receives a blockchain update comprising a first transaction with instructions to perform an engine startup or shutdown; the blockchain update is validated; an engine startup or shutdown is performed based on the validated blockchain update; where the engine startup or shutdown is delayed based on validating a predetermined number of subsequent blockchain updates, including a second transaction with instructions to perform the engine startup or shutdown.

19 Claims, 11 Drawing Sheets

Related U.S. Application Data filed on Dec. 20, 2018, provisional application No. 62/782,984, filed on Dec. 20, 2018.

(51) Int. Cl.

| | |
|---|---|
| H04L 9/06 | (2006.01) |
| G05B 19/042 | (2006.01) |
| H04L 9/00 | (2022.01) |
| G06F 16/23 | (2019.01) |
| B64D 31/06 | (2006.01) |
| F02C 7/26 | (2006.01) |
| G06F 16/182 | (2019.01) |
| G06F 12/1018 | (2016.01) |
| G06F 21/12 | (2013.01) |
| G06F 21/57 | (2013.01) |
| H04L 9/32 | (2006.01) |
| H04L 9/08 | (2006.01) |
| H04L 9/40 | (2022.01) |
| G06F 16/242 | (2019.01) |
| G06F 16/245 | (2019.01) |
| H04L 9/34 | (2006.01) |
| H04L 9/38 | (2006.01) |

(52) U.S. Cl.
CPC ........ *G06F 12/1018* (2013.01); *G06F 16/182* (2019.01); *G06F 16/2379* (2019.01); *G06F 16/242* (2019.01); *G06F 16/245* (2019.01); *G06F 21/125* (2013.01); *G06F 21/575* (2013.01); *H04L 9/006* (2013.01); *H04L 9/06* (2013.01); *H04L 9/0618* (2013.01); *H04L 9/0637* (2013.01); *H04L 9/0643* (2013.01); *H04L 9/0825* (2013.01); *H04L 9/32* (2013.01); *H04L 9/3242* (2013.01); *H04L 9/3263* (2013.01); *H04L 9/34* (2013.01); *H04L 9/38* (2013.01); *H04L 63/0435* (2013.01); *H04L 63/062* (2013.01); *H04L 63/0823* (2013.01); *H04L 63/123* (2013.01); *H04L 9/50* (2022.05); *H04L 2463/062* (2013.01)

(58) Field of Classification Search
CPC ....... H04L 9/0643; H04L 9/0825; H04L 9/32; H04L 9/3242; H04L 9/3263; H04L 9/34; H04L 9/38; H04L 63/04; H04L 63/0428; H04L 63/0435; H04L 63/062; H04L 63/0823; H04L 63/123; H04L 9/50; H04L 2463/062; H04L 63/10; G06F 16/182; G06F 16/2379; G06F 16/242; G06F 16/245; G06F 12/1018; G06F 21/125; G06F 21/575; B64D 31/06; F02C 7/26; G05B 19/0425

See application file for complete search history.

(56) References Cited

U.S. PATENT DOCUMENTS

| | | |
|---|---|---|
| 8,443,183 B2 | 5/2013 | Lin et al. |
| 8,788,839 B1 | 7/2014 | Dong et al. |
| 9,407,437 B1 | 8/2016 | Campagna |
| 9,733,950 B2 | 8/2017 | Samuel et al. |
| 10,013,573 B2 | 7/2018 | Dillenberger |
| 10,114,969 B1 | 10/2018 | Chaney et al. |
| 10,542,610 B1 | 1/2020 | Slupik |
| 11,057,240 B2 | 7/2021 | Skertic et al. |
| 2004/0181303 A1 | 9/2004 | Walmsley |
| 2004/0249757 A1 | 12/2004 | Walmsley et al. |
| 2005/0257073 A1 | 11/2005 | Bade et al. |
| 2009/0138727 A1 | 5/2009 | Campello de Souza |
| 2010/0220863 A1 | 9/2010 | Dupaquis |
| 2012/0210115 A1 | 8/2012 | Park et al. |
| 2012/0304024 A1 | 11/2012 | Rohleder et al. |
| 2013/0332025 A1 | 12/2013 | Ziarno |
| 2016/0226657 A1 | 8/2016 | Thom et al. |
| 2016/0318620 A1* | 11/2016 | Olson ................ F01D 21/14 |
| 2016/0334786 A1* | 11/2016 | Warpinski ................ B64F 1/22 |
| 2017/0017211 A1 | 1/2017 | Periasamy et al. |
| 2017/0243011 A1 | 8/2017 | Tschache |
| 2017/0243012 A1 | 8/2017 | Karame et al. |
| 2017/0329980 A1* | 11/2017 | Hu ........................ H04L 63/04 |
| 2018/0001184 A1 | 1/2018 | Tran et al. |
| 2018/0025181 A1 | 1/2018 | Barinov et al. |
| 2018/0176228 A1* | 6/2018 | He ........................ H04W 12/06 |
| 2018/0191502 A1 | 7/2018 | Karame |
| 2018/0219671 A1 | 8/2018 | Velissarios et al. |
| 2018/0260921 A1* | 9/2018 | Wagstaff ................ H04L 9/3236 |
| 2018/0299878 A1 | 10/2018 | Celia |
| 2019/0005470 A1 | 1/2019 | Uhr et al. |
| 2019/0092280 A1* | 3/2019 | Oesterling ............ H04W 12/04 |
| 2019/0199693 A1 | 6/2019 | Vityaz |
| 2020/0057752 A1 | 2/2020 | Tofano |
| 2020/0198797 A1 | 6/2020 | Skertic et al. |
| 2020/0213823 A1 | 7/2020 | Elkhail et al. |
| 2021/0078512 A1 | 3/2021 | Ghannam et al. |
| 2021/0097430 A1 | 4/2021 | Das |
| 2021/0273819 A1 | 9/2021 | Rueckriemen |

\* cited by examiner

| | |
|---|---|
| Transaction (5,a) | Payload: Activity, Performance Time, Target of Activity, CP to Activity<br>Author<br>Nonce<br>Digital Signature |
| Transaction (5,b) | Payload: Activity, Performance Time, Target of Activity, CP to Activity<br>Author<br>Nonce<br>Digital Signature |
| ... | |
| Transaction (5,n) | Payload: Activity, Performance Time, Target of Activity, CP to Activity<br>Author<br>Nonce<br>Digital Signature |
| Solution 5 | HASH{RN; Digital Signature (5,a); Digital Signature (5,b); Digital Signature (5,c); Solution 4} |

FIG. 5

| Transaction (N,n) | Payload<br>    Activity: Close Second Valve<br>    Performance Time: Immediate<br>    Target: PUBt<br>    Conditions Precedent: Approval from PUBx and PUBy<br>Author: PUBt<br>Nonce<br>Digital Signature with PRIVt |
|---|---|

...

| Transaction (N,n+30) | Payload<br>    Activity: Approve,<br>    Performance Time: Immediate<br>    Target: Transaction (N,n),<br>    Conditions Precedent: N/A<br>Author: PUBx<br>Nonce<br>Digital Signature with PRIVx |
|---|---|

...

| Transaction (N+4,n-70) | Payload<br>    Activity: Approve,<br>    Performance Time: Immediate<br>    Target: Transaction (N,n),<br>    Conditions Precedent: N/A<br>Author: PUBy<br>Nonce<br>Digital Signature with PRIVy |
|---|---|

FIG. 6

| Transaction (N,n) | Payload: Fully Close Second Valve (Activity) at later of... (Performance Time), PUBt (Target), Target Velocity = 0 and Target Altitude = 0 and Target Brakes = Engaged (CP)<br>Author: PUBx<br>Nonce<br>Digital Signature with PRIVx |
|---|---|
| Transaction (N+1,n) | Payload: Approve Target Velocity = 0 (Activity), Immediate (Performance Time) Transaction (N, n) (Target), Approval from PUBz (CP)<br>Author: PUBx<br>Nonce<br>Digital Signature with PRIVx |
| Transaction (N+1,n+1) | Payload: Approve Target Altitude = 0 (Activity), Immediate (Performance Time) Transaction (N, n) (Target), N/A (CP)<br>Author: PUBa<br>Nonce<br>Digital Signature with PRIVa<br>Digital Certificate signed by PRIVy |
| Transaction (N+3,n) | Payload: Approve Target Brakes Engaged (Activity), Immediate (Performance Time), Transaction (N,n) (Target), N/A (CP)<br>Author: PUBt<br>Nonce<br>Digital Signature with PRIVt |
| Transaction (N+5,n) | Payload: Approve (Activity), Immediate (Performance Time) Transaction (N+1, n) (Target), N/A (CP)<br>Author: PUBz<br>Nonce<br>Digital Signature with PRIVz |
| Transaction (N+8, 0) | |

FIG. 8

BLOCKCHAIN BASED VEHICLE CONTROL

CROSS-REFERENCE TO RELATED APPLICATIONS

The present application is a non-provisional application of, and claims priority to, U.S. Provisional Application No. 62/783,017, filed Dec. 20, 2018, title: BLOCKCHAIN BASED VEHICLE CONTROL. The present application also claims priority to U.S. Provisional Application No. 62/782,984, filed Dec. 20, 2018, title: SECURE ENGINE COMMUNICATION and U.S. Provisional Application No. 62/785,601, filed Dec. 27, 2018, title: A METHOD AND PROCESS FOR BLOCKCHAIN IMPLEMENTATION WITH THIRD PARTY DEVICES. The present application is also related to co-pending U.S. application Ser. No. 16/283,644, filed Feb. 22, 2019, title: A METHOD AND PROCESS FOR SECURING AN EXECUTABLE IMAGE. The entireties of each of these applications are incorporated herein by reference.

BACKGROUND

Pilots currently deactivate aerospace turbine engines by turning off master levers and toggle switches in a cockpit. Doing so cuts jet fuel flow to the engine and the on-board engine controller automatically turns off remaining systems in the engine in response. Failure events may sever wires harnesses leading from the cockpit to the engine, which may undesirably allow jet fuel to flow into an unstable engine.

In several incidents logged by aviation authorities, this type of engine failure has caused excessive delays and damage to the aircraft. One example that occurred within the last few years were the events observed during the QF32 uncontained engine failure in 2011. During this Qantas flight the engine suffered an uncontained turbine disc failure on the Number 2 engine. The root cause of this incident was attributed to a manufacturing defect found in one of the pipes in the oil system. While the flight was able to continue to operate and land safely, the Number 1 engine was not able to be turned off when commanded from the cockpit, resulting in a team of fire fighters on the ground working for in excess of 3 hours after the plane landed to drown the Number 1 engine into shutting down. If failure to shut down occurs during an overspeed event, an uncontained engine failure may result. Due to the inherent dangers in getting too close to the inlet or exhaust of a large engine with thrust in the range of 80 to 100,000 pounds, emergency exiting of a plane may be restricted and manual shutdown at the engine would not be feasible.

It would be advantageous to be able to wirelessly shut down an engine. As this presents a danger of hacking, a secure means of sending a wireless shut down signal in needed.

A blockchain being a cryptographically secure ledger containing many different transactions, may be used to provide secure wireless communication with the engine. The transactions may be grouped into blocks. The blocks may be linked (i.e., chained) together with cryptographic algorithms to form a blockchain. An advantage of blockchain is its integrity. Once appended to the blockchain for a sufficient amount of time, revising blocks to add, modify, and/or remove transactions becomes intractable (i.e., substantially impossible). In existing implementations of blockchain (e.g., Bitcoin, Ethereum), transactions are often financial events in which a sender transfers cryptocurrency to a receiver.

SUMMARY

Among other things, the present application discloses controlling a vehicle based on transactions in a blockchain (also called a distributed ledger or a cryptographic ledger). The vehicle may be an aircraft and a blockchain transaction may include an engine deactivation instruction (e.g., an instruction to cut fuel flow into the engine). The engine may deactivate in response to the instruction. In some embodiments, the blockchain may include transactions building a complete record of engine starting and stopping sequences. The security features of the blockchain may ensure that an engine deactivation command authored by an unauthorized party is rejected.

A blockchain may include one or more vehicle-control commands embedded in each transaction. Each transaction may include a self-authenticating cryptographic signature. After receiving and verifying an update to the blockchain, a vehicle may implement the commands. The commands may cause the vehicle to perform a physical activity (e.g., accelerate, decelerate, steer, start an engine, stop an engine, etc.) and/or perform an electronic activity (e.g., update internal software, change route and/or destination, send an electronic message, etc.).

The blockchain may include vehicle-control commands for multiple different vehicles. By monitoring the blockchain, the vehicle may anticipate upcoming physical activity of surrounding vehicles. As a result, movement of multiple vehicles may be coordinated.

BRIEF DESCRIPTION OF DRAWINGS

The present Specification may be read in conjunction with the appended Figures. The Figures show some of the illustrative embodiments discussed in the Specification. As further stated below, the claimed inventions are not limited to the illustrative embodiments. For clarity and ease of reading, Figures may omit views of certain features.

FIG. 5 schematically depicts blockchain transactions.

FIG. 6 schematically depicts blockchain transactions.

FIG. 8 schematically depicts blockchain transactions.

DETAILED DESCRIPTION

Figure 1:
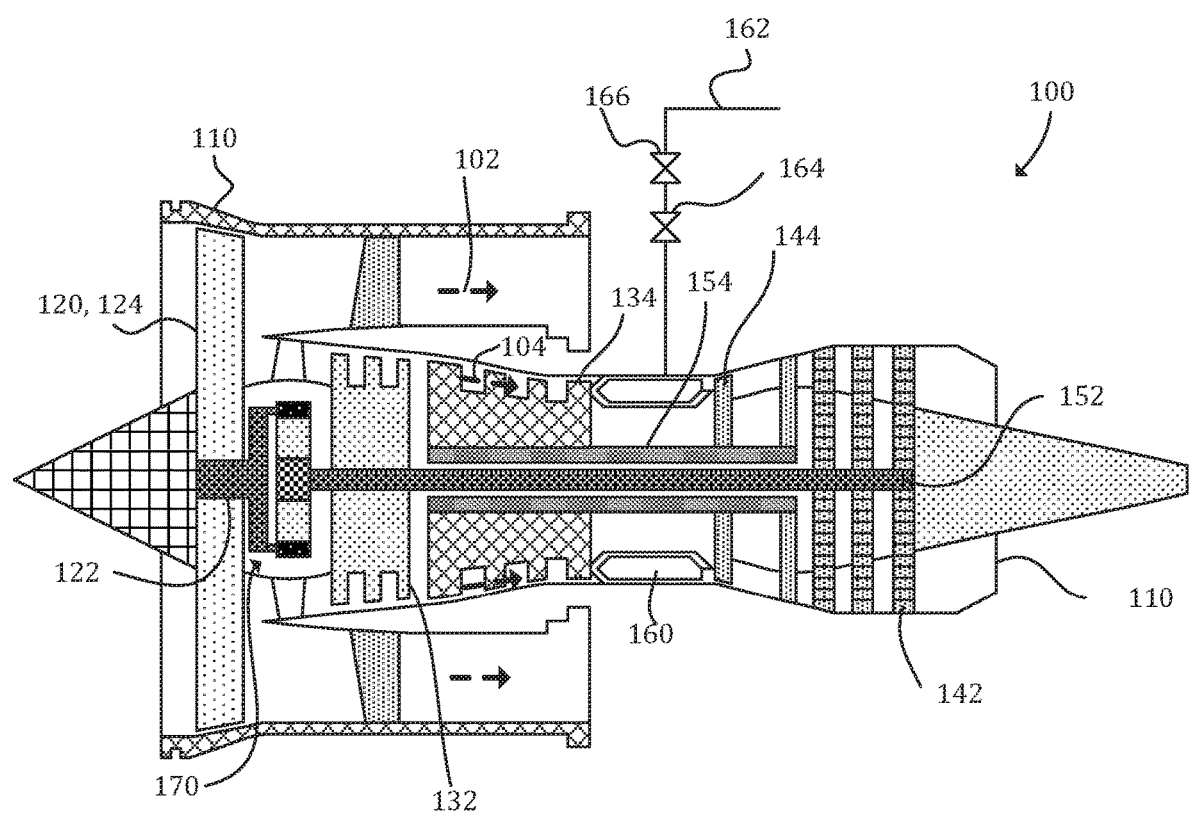
FIG. 1 is a schematic cross-section of an exemplary aircraft engine.

FIG. 1 shows a gas turbine engine 100 for an aircraft. Engine 100 may include static casing 110 for splitting air exiting a fan 120 into a bypass flow path 102 and a core flow path 104. Air following core flow path 104 may be compressed at a low pressure compressor 132 driven by a low pressure mainshaft 152 and at a high pressure compressor 134 driven by a high pressure mainshaft 154.

In combustor 160, air may mix with jet fuel supplied through a fuel line 162 connected to a fuel tank (not shown) one or more valves 164, 166 may be disposed along fuel line 162. According to some embodiments, first valve 164 is a variable opening valve, configured to occupy a fully open, fully closed, or partially open states, while second valve 166 is a gate valve, which may be configured to either be fully open or fully closed. Second valve 166 may be disposed upstream of first valve 164. According to some embodiments, the function performed by second valve 166 may be integrated into first valve 164.

Combustor 160 may ignite the mixture of jet fuel and air. The high energy combustion products may flow through high pressure turbine 144 to drive high pressure mainshaft 154 and low pressure turbine 142 to drive low pressure mainshaft 152.

Low pressure mainshaft 152 may drive epicyclic gearbox 170, which may have, for example, a planetary or star design. In turn, epicyclic gearbox 170 may drive a fan shaft 122 to which fan blades 124 are secured. Epicyclic gearbox 170 may enable low pressure mainshaft 152 to rotate at higher speed while driving fan 120 at a lower speed. In direct drive embodiments (not shown), low pressure mainshaft 152 may be directly secured to fan shaft 122. Gearbox 170 may be omitted.

A processing system (further discussed below) may be configured to control engine 100. During typical use, engine 100 (i.e., the processing system controlling engine 100) may regulate the opening degree of first valve 164 based on user throttle inputs. The first valve 164 affects the flow rate of jet fuel into combustor 160, and thus the thrust delivered by engine 100.

When a failure event occurs, a user may instruct engine 100 to cut all fuel supply to combustor 160 by closing second valve 166 to block fuel line 162. The instruction may be an electronic data packet traveling from the cockpit to engine 100 through wired electrical connections.

Some failure events may sever wires extending between the cockpit and engine 100, disabling engine deactivation through a wired connection. Therefore, engine 100 may be configured to terminate fuel flow to engine 100 in response to wireless communications. For security reasons, the wireless data may be structured as updates to a blockchain capable of conveying instructions to close second valve 166. Although engine 100 is illustrated as being a gas turbine, the features disclosed herein may be used to control any kind of vehicle (e.g., car, aircraft, ship, etc.) with any kind of engine (e.g., internal combustion engine, electric motor, etc.).

By enabling engine deactivation through blockchain, embodiments of the present disclosure remedy the inability of current engine control systems to implement a cybersecure engine shutoff (i.e., deactivation) after an event severing the wired connection between cockpit and engine. To ensure that a blockchain-based engine deactivate command originates from an authorized source, embodiments of the present disclosure may require a processing system in an aircraft (e.g., one located in the cockpit) to author the command.

Figure 2:
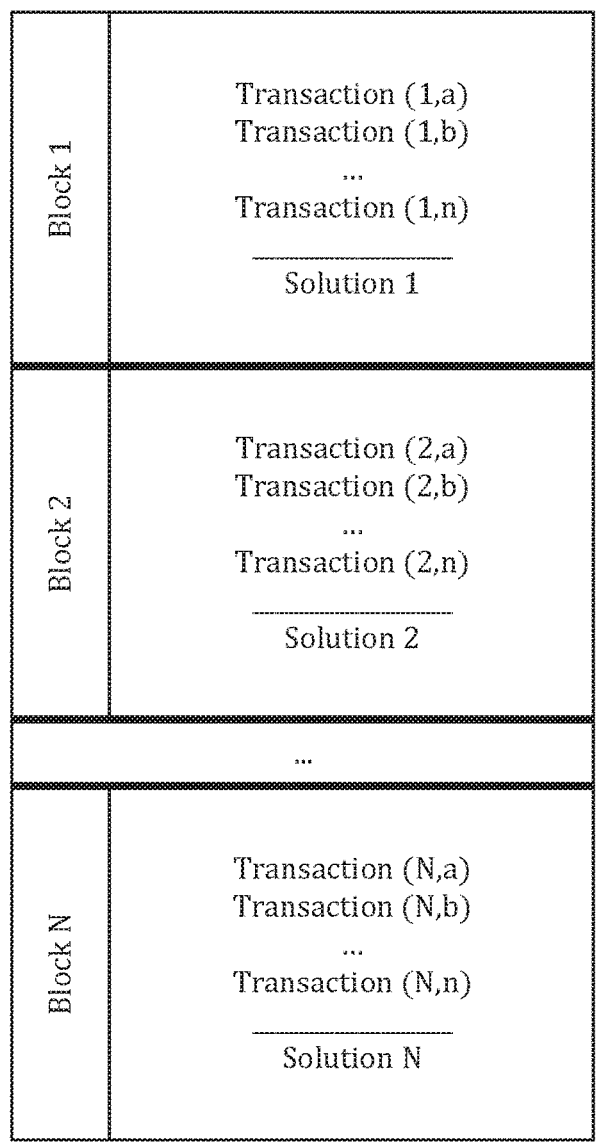
FIG. 2 is a schematic representation of an exemplary blockchain.

FIG. 2 shows an exemplary blockchain 200 (also called a distributed ledger). Blockchain 200 may be defined by a series of blocks labeled Blocks 1, 2 . . . N, N+1 where Block 1 precedes Block N in origination time, which precedes Block N+1 in origination time. Each block may include a series of transactions labeled as Transactions (X, Y) where "Y" identifies location within Block X. Similar to blocks, transactions may be listed in time-descending order such that Transaction (1, n) precedes Transaction (1, n+1) in origination time.

Multiple times may be associated with each block/transaction, including an origination time (e.g., when the block/transaction was first generated), a performance time (e.g., when an activity in the transaction should be performed), and a receiving time (e.g., when the generator of a block receives a transaction). Therefore, Transaction (1, n) may precede Transaction (1, n+1) in receiving time and Transaction (1, n+1) may precede Transaction (1, n) in origination time. Although described above as being organized in terms of receiving time, blocks and transactions may be grouped in any desired order.

Figure 3:
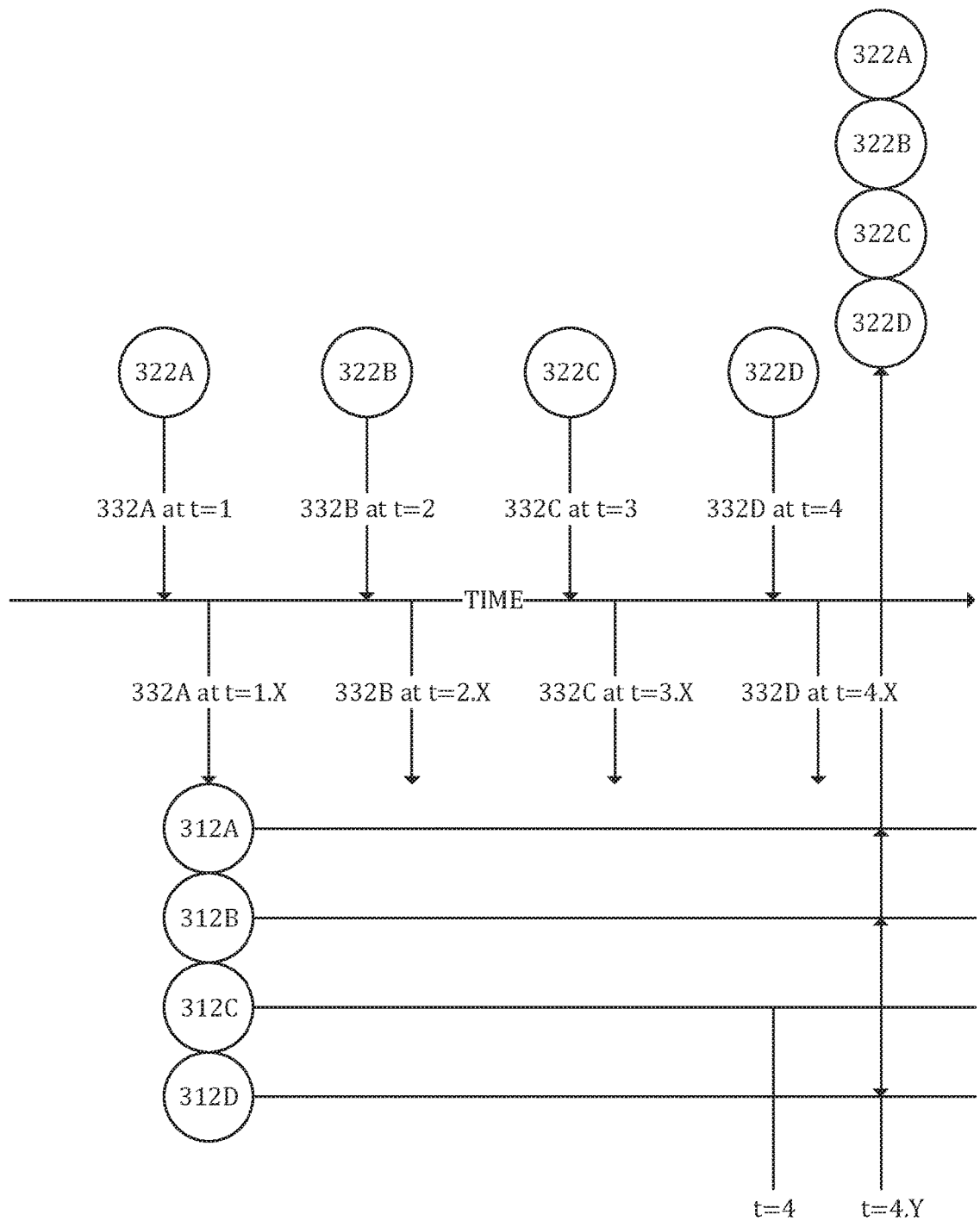
FIG. 3 is a schematically depicts how transactions are added to the blockchain.

Referring to FIG. 3, blockchain 200 may be distributed across a network of hosts 312 and clients 322. Hosts 312 may maintain a complete version of blockchain 200. Hosts 312 may be configured to form new blocks from floating transactions (e.g., the transactions that have occurred since the most recent block).

Clients 322 may be end-users of blockchain 200. Clients 322 may generate and distribute transactions for integration into blockchain 200. Clients 322 may perform activities listed within transactions generated by other clients or hosts. Clients 322 may maintain an incomplete version of blockchain 200 (e.g., the most recent ten blocks and a hash of the earlier blocks). A single device may simultaneously function as a host 312 and as a client 322. According to some embodiments, each host 312 is a client 322 and vice-versa.

According to some embodiments, blockchain 200 may be configured to build consensus with a proof-of-work scheme. According to other embodiments, blockchain 200 may rely on a proof-of-stake scheme for consensus building. Under a proof-of-work scheme, hosts 312 may attempt solutions to a public mathematical problem. As further discussed below, the mathematical problem may (a) directly depend on each floating transaction and the previous block and (b) indirectly depend on every previous transaction listed in every previous block.

Figure 4:
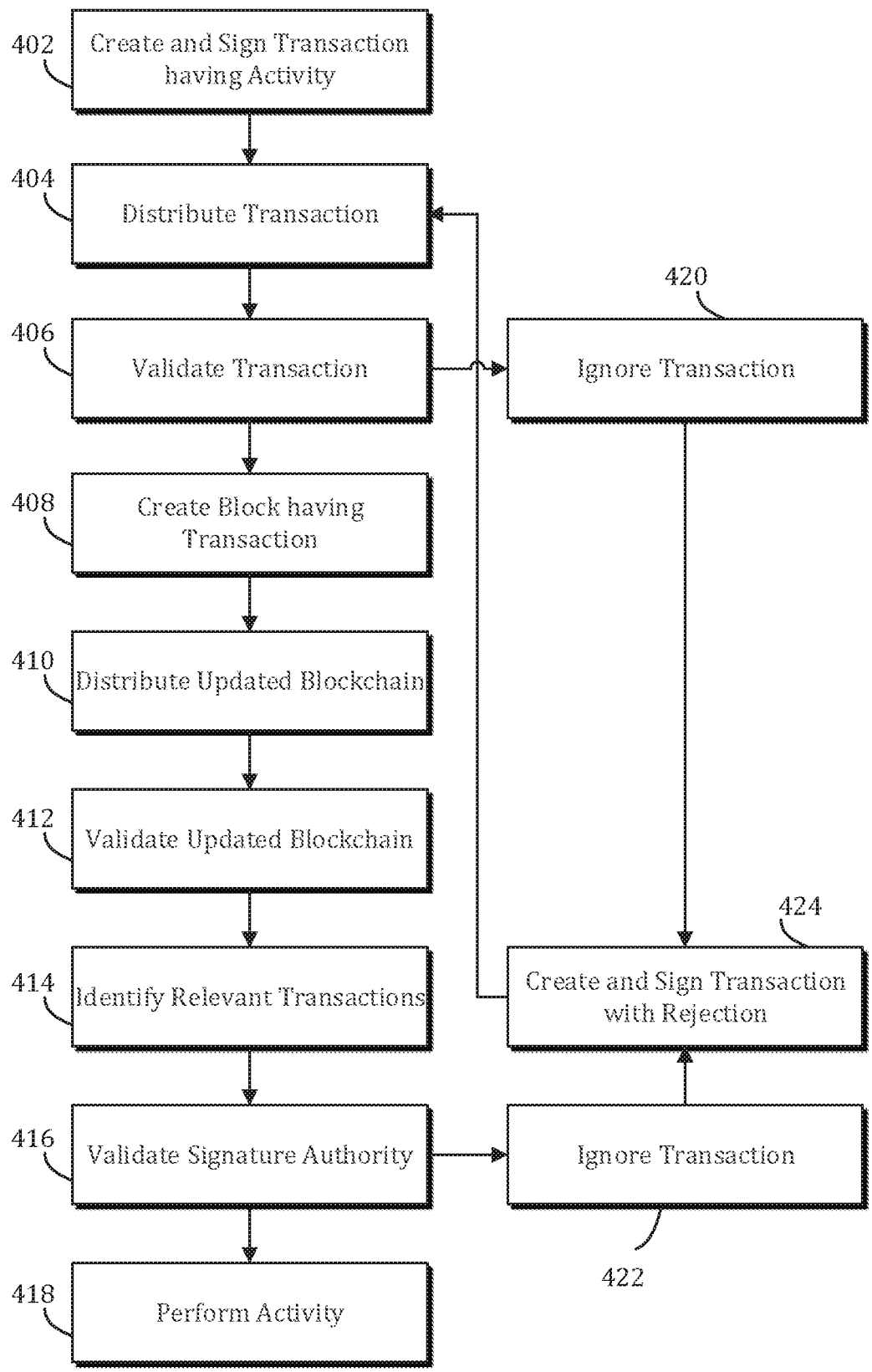
FIG. 4 is a diagram of an exemplary method of updating and using the blockchain.

FIG. 4 illustrates how hosts 312 may append new blocks containing new transactions to blockchain 200. Referring to FIG. 4, first client 322A may distribute a first transaction 332A at t=1, second client 322B may distribute a second transaction 332B at t=2, third client 322C may distribute a third transaction 332C at t=3, and fourth client 322D may distribute a fourth transaction 332D at t=4.

First, second, third, and fourth hosts 312A-D may receive first transaction 332A at t=1.X, where "X" may vary from host to host. Each host 312 may receive first transaction 332A at a slightly different time. Each host 312 may attempt solutions to a first mathematical problem. The first mathematical problem may directly depend on transaction 332A, any other floating transactions (not shown), the previous block (not shown) and indirectly depend on (i.e., be based) every previous transaction and block.

At t=2.X hosts 312A-D may receive second transaction 332B. Each host may now guess solutions to a revised second mathematical problem directly depending on transaction 332B in addition to each dependency of the first mathematical problem. At t=3.X hosts 312A-D may receive third transaction 332C and repeat the same process with a third mathematical problem.

At t=4, third host 312C may correctly guess the solution to the third mathematical problem directly depending on all floating transactions (including 332A, 332B, and 332C), the previous block, and indirectly depending on every previous transaction and block. The version of blockchain 200 possessed by third host 312C now includes N blocks where the version of blockchain 200 possessed by other hosts and clients 312, 322 only includes N−1 blocks.

At t=4.X hosts 312A-D may receive fourth transaction 332D. Third host 312C may begin guessing the solution to a fourth mathematical problem directly depending on the block created at t=4 and fourth transaction 332D. First, second, and fourth hosts 312A, 312B, 312D, being unaware of block N, may still be attempting the solution to the third mathematical problem.

At t=4.Y, "Y" being any real number greater than "X", first, second, and fourth hosts 312A, 312B, 312D, along with clients 322 may receive the new block. The hosts 312 and clients 322 may confirm that the new block is valid. If valid, first, second, and fourth hosts 312A, B, and D may join third host 312C in attempting solutions to the fourth mathematical problem.

As shown in FIG. 2, each block may conclude with a solution to a mathematical problem. Each mathematical problem may be structured as follows: find real number RN such that H{RN, the solution-tag of the previous block, and transaction-tag of each floating transaction}=Y, where H{} is a known hashing function (e.g., SHA-256) and Y has predetermined properties (e.g., begins with a predetermined number of consecutive zeros).

Once RN is found, then the solution for the block may be [RN, Y], with RN representing the solution-nonce and Y being called the solution-tag. Transaction-tags are discussed below. An exemplary solution-tag formula appears at the bottom of FIG. 5.

The hashing function H{} may be computationally simple to perform while intractable to reverse. Put differently, it may be intractable to find the inputs that would generate a desired output. Because RN depends on each transaction-tag, the solving host may not remove any of the confirmed transactions without invalidating RN.

Referring to FIG. 4, and at box 402, a client 322 may create a transaction for blockchain 200. The transaction may include an activity and a digital signature. The client may be, for example, a processing system disposed in an aircraft or in a ground-station (e.g., a control tower). According to some embodiments, the activity is an instruction to deactivate a gas turbine engine 100 by instructing second fuel valve 164 to close. Other activities are further discussed below.

At box 404, the client may distribute the transaction to other clients 322 and hosts 312 over a network (e.g., the Internet). At box 406, the hosts may validate the transaction (e.g., confirm the digital signature is valid by determining that the digital signature of the transaction is consistent with the public key listed as the author of the transaction). If valid, the hosts may compete to create a new block integrating the transaction at box 408. The hosts may apply the process described with reference to FIG. 3.

At box 410, the solving host (i.e., the host with the first valid solution) may distribute a new block of blockchain 200 to clients 322 and hosts 312 over the network. The new block may include the transaction and the solution. At box 412, each device receiving the blockchain update (i.e., the new block) may validate the block by validating each of the confirmed transactions and the solution. At box 414, the clients may analyze the updated blockchain to identify relevant transactions. For a given client, relevant transactions may include those addressed to the client and transactions addressed to others that may eventually affect the client. Determination of relevant transactions is further discussed below.

At box 416, the clients may confirm that the author of each relevant transaction had authority to issue the transaction. For example, each client may store a list identifying which authors (i.e., public keys) are authorized to command which activities. For example, only public keys A-C may be authorized to issue transactions with a hard engine shutoff activity (e.g., closure of second valve 166). If a transaction with a hard engine shutoff activity was issued by public key D, then the client may ignore the transaction or software.

In response to determining that the author possessed authority, the client may perform the activity contained within the transaction. According to some embodiments, box 416 may occur during box 406 (e.g., hosts may perform box 416 when determining which floating transactions to integrate in a block such that a host will not add an otherwise valid transaction with an unauthorized signature to a block).

In some instances, transactions may be self-authorizing by including a digital certificate issued by a trusted party (e.g., an engine manufacturer). Hosts and clients may be configured to determine that an unknown transaction author possessed authority to originate the transaction if the digital signature author had authority to originate the transaction and the transaction includes a digital certificate addressed to the unknown transaction author.

Returning to box 406, hosts may ignore invalid transactions at box 420. Here, "ignore" means refrain from adding to the blockchain. Invalid transactions may include those with invalid digital signatures, nonsensical activities, etc. Returning to box 416, clients may ignore transactions with unauthorized signatures (i.e., valid transactions with an unauthorized author) at box 422.

According to some embodiments, the client 312 or host 322 discarding or ignoring an invalid/unauthorized transaction may distribute a rejection transaction at boxes 424 and 404. The rejection transaction may include a copy of the invalid/unauthorized transaction along with the reasons for discarding/ignoring the transaction. The rejection transaction may be appended to the blockchain.

In some embodiments, a cockpit processing system disposed (i.e., at least partially disposed) in an aircraft cockpit may be configured for wireless communication with an engine processing system disposed in an aircraft engine. The cockpit processing system may be a client 312 or host 322 and the engine processing system may be a client 312 or host 322. The engine processing system may be configured to reject (e.g., discard, ignore) any blockchain transactions with an author other than the cockpit processing system.

In some instances, a processing system capable of implementing an engine deactivation and/or a processing system capable of authoring an engine deactivation command may be configured to only do so upon confirming that one or more (e.g., all, any two, etc.) of the following conditions are met: (a) weight sensors verify that the full aircraft weight is being transmitted to ground through the aircraft wheels, (b) the aircraft is at full stop as detected by one or more speed sensors, (c) the master fault lever in the cockpit is engaged, and/or (d) the brakes are engaged as detected by one or more brake engagement sensors.

Referring to FIG. 5, each transaction of blockchain 200 may include a payload, an author, a nonce, and a digital signature. The payload may include activities, performance times, targets, and conditions precedent. The payload may be encrypted while the author and nonce are unencrypted.

The author may be the originator of the transaction. Each device in communication with blockchain 200 may have a unique asymmetric keypair defined by a unique public key and a unique private key. Because each public key is unique, the public key may be used to identify the author. The nonce may be an arbitrary number and/or timestamp to prevent replay attacks.

The digital signature may confirm that the party (e.g., public key) listed as the author of a transaction is accurate. As stated above, each device may have a unique public key and a unique private key. The public key may be configured to (a) encrypt messages that may only be decrypted by the paired private key and (b) decrypt messages encrypted with the paired private key. The private key may be configured to (a) encrypt messages that may only be decrypted by the paired public key and (b) decrypt messages encrypted with the paired public key.

A host/client 312, 322 may create a digital signature for any dataset by (a) hashing each element of the dataset including a public key to create a tag, (b) encrypting the tag with the paired private key to create the transaction-tag, (c) and listing, as unencrypted data, each element of the dataset, the encrypted tag, and the applied hashing formula. A host/client 312, 322 may validate a digital signature by (a) hashing each element of the dataset according to the applied hashing formula to create a twin tag and (b) decrypting the transaction-tag with the public key. If the twin tag is identical to the decrypted transaction-tag, then the receiver may be confident in the authenticity of the message (e.g., validate the message).

As stated above, a payload may include an activity. An activity may be any mechanical and/or electrical command capable of being implemented by a vehicle. Examples of activities include instructions to arrive at a specified destination and/or use a specified route (e.g., for autonomous vehicles), achieve a specified velocity and/or position vector, open or close a specific valve (e.g., second valve 166 to cut fuel supply), update a piece of software, run a certain software program, transmit a message, update values within a software program.

Further examples of activities include issuing transactions in reply to earlier transactions, including issuing requested approvals (further discussed below). Each activity may be grouped with a different performance time (e.g., immediate, at specified future time) and a different target. Some payloads (e.g., all payloads in transactions originating from an engine) may include identifying features of an engine, such as the engine operating history, manufacturer, serial number, software configuration, date of manufacture, and date of qualification.

Conditions precedent may be events that must occur before the activity may be performed. For example, a transaction may include a condition precedent requiring approval of the transaction by a predetermined author (e.g., public key). The condition precedent may further require the approval to be confirmed in the same block as the transaction. Conditions precedent are further discussed below.

Referring to FIGS. 1 and 6, an aircraft processing system (e.g., a processing system disposed exclusively in an aircraft engine, across an aircraft (e.g., in a cockpit and engine), etc.) may be configured to open and close first and second fuel valves 164, 166 in response to transactions within blockchain 200.

Referring to FIG. 6, Transaction (N, n) may include fully closing second valve 166 (i.e., perform a hard shutoff of a gas turbine engine, the activity) immediately (performance time). The target public key ("PUBt") (i.e., addressee) may be the public key of an engine or the public key of an aircraft along with an identifier of the engine. The author may be identical to the target (i.e., both the author and target may be the target public key PUBt). Alternatively, the author may be any other client 322 or host 312. The nonce may be a timestamp of the request origination. The digital signature may include an encrypted hash of the payload, author, nonce, and any other data (not shown) to be authenticated.

Conditions precedent may include approvals of (e.g., confirmations of, assents to) transaction (N, n) by a predetermined subset of public keys (e.g., public keys X and Y ("PUBx" and "PUBy"). The predetermined subset may be listed in the transaction. Public key X (PUBx) may belong to a control tower. Public key Y (PUBy) may belong to an engine manufacturer. In some embodiments, a first processing system of a vehicle (e.g., an engine processing system) may be configured to treat an approval of a second vehicle processing system of the vehicle (e.g., a cockpit processing system) as a required condition precedent for at least some activities. For example, an engine processing system may require that a cockpit processing system originate or approve any transaction containing an engine shutdown command.

Transaction (N, n+30) may be confirmed in the same Block N as Transaction (N, n). The payload of Transaction (N, n+30) may include an approval activity with Transaction (N, n) as the activity target. Since Transactions (N, n) and (N, n+30) are confirmed simultaneously, other data (e.g., the transaction-tag) may be used to identify Transaction (N, n). Conditions precedent may be absent.

Public key X (PUBx) may be the author of Transaction (N, n+30). Public key X (PUBx) may be the public key of an asymmetric keypair belonging, for example, to a control tower. Transaction (N, n+30) may include a digital signature created with the private key ("PRIVx") paired with Public key X (PUBx).

Since Transaction (N, n+30) refers (indirectly, through Transaction (N, n)) to the target public key (PUBt), the target may determine whether Transaction (N, n+30) is authorized, then update the status of Transaction (N, n) to reflect that one of the conditions precedent has been fulfilled. The target may determine that a confirmation from public key Y (PUBy) is needed before performing the activity in Transaction (N, n).

Transaction (N+4, n−70) may be integrated into a block (i.e., confirmed) four blocks later than block N. The payload of Transaction (N+4, n−70) may include a confirmation activity with Transaction (N, n) as the activity target.

Public key Y (PUBy) may be the author of Transaction (N+3, n−70). Public key Y (PUBy) may be the public key of an asymmetric keypair belonging, for example, to an engine manufacturer. Transaction (N+3, n−70) may include a digital signature created with the private key paired with PUBy.

Upon validating block N+4 of blockchain 200, the target may search block N+4 for relevant transactions. The target may identify Transaction (N+4, n−70) as relevant for indirectly referring to the target public key (PUBt). Upon determining that Transaction (N+4, n−70) fulfills the final outstanding condition precedent for Transaction (N, n), the target may perform the activity in Transaction (N, n). Therefore, the target may fully close second valve 166 (i.e., perform the activity in Transaction (N, n) addressed to the target) at the performance time (i.e., immediately).

According to some embodiments, the performance time may require a certain number of blocks to be validated after the last outstanding condition precedent is integrated into a block. For example, the performance time may be set as (a) thirty seconds after the last outstanding approval is first confirmed in a block (b) only if the block containing the last outstanding approval is followed by a predetermined number of blocks. As shown in this example, elements of performance times may operate as conditions precedent.

Figure 7:
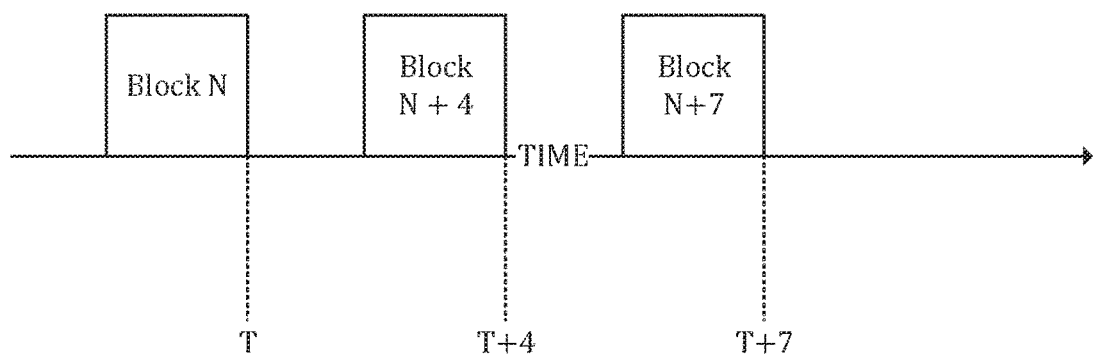
FIG. 7 is a schematically depicts the time-sequence of blocks in the blockchain.

Put differently, the target may delay performing any activities in a new block until a predetermined number of subsequent blocks are validated. Referring to FIG. 7, the target may validate block N at time T, block N+4 at time T+4, and block N+7 at time T+7. Therefore, the target may validate Transaction (N+4, n–70) at time T+4. However, the target may be configured to delay performing any activities in block N+4 until at least a predetermined number of blocks are validated subsequent block N+4. If the predetermined number is three, the target may delay until block N+7 is validated.

Referring to FIG. 8, Transaction (N, n) may include an activity of fully closing second valve 166 (i.e., performing a hard shutoff of a gas turbine engine) at the later of: (a) forty seconds after the creation time the block approving the last outstanding condition precedent and (b) the validation of three blocks subsequent to the block approving the last outstanding condition precedent. The activity target (i.e., the target public key (PUBt)) may be the public key of an aircraft. Conditions precedent may include approvals of transaction (N, n) by specified public keys (as described with reference to FIG. 6) and/or confirmation of certain physical events (e.g., speed of target, altitude of target, status of brakes). Public key X (PUBx), the author of Transaction (N, n) may be the control tower.

In FIG. 8, Transaction (N, n) includes the following conditions precedent: target velocity=0, target altitude=0, target brake status=engaged). Transaction (N, n) may only permit condition-precedent approvals issued (a) by any author in a predetermined trusted group and/or (b) with a digital certificate possessing predetermined trusted features (e.g., being signed by a valid authority). In the example of FIG. 8, the predetermined trusted group may consist of the target public key (PUBt), public key X (PUBx), and public key Y (PUBy) while the predetermined trusted features may consist of a digital certificate signed with PRIVy.

As shown, Transaction (N+1, n) includes an activity confirming that the target velocity is zero (i.e., the target is immobile). Public key X (PUBx) is the author. Conditions precedent consist of approval from public key Z (PUBz). Block N+1 has a creation time of T.

Transaction (N+1, n+1) includes an activity approving (i.e., confirming) that the target altitude is zero (i.e., the target is grounded). The author is public key A (PUBa). The transaction includes a digital certificate signed by Private key Y (PRIVy). There are no conditions precedent.

Transaction (N+3, n) includes an activity approving (i.e., confirming) that the target brakes are engaged. The target public key (PUBt) is the author. There are no conditions precedent. Block N+3 has a creation time of T+10 seconds.

Transaction (N+5, n) includes an activity approving (i.e., confirming) transaction (N+1, n). Public key Z (PUBz) is the author. There are no conditions precedent. Block N+5 has a creation time of T+15 seconds.

After block N+3, the only outstanding condition precedent of Transaction (N, n) is the target velocity being measured as zero. Transaction (N+1, n+1), which approves the final outstanding condition precedent, is confirmed in Block N+5. If Block N+8 has a creation time less than or equal to T+40, then the target may perform the hard engine shutoff at T+40. If Block N+8 has a creation time greater than T+40, then the target may perform the hard engine shutoff the moment after validating Block N+8.

Figure 9A:
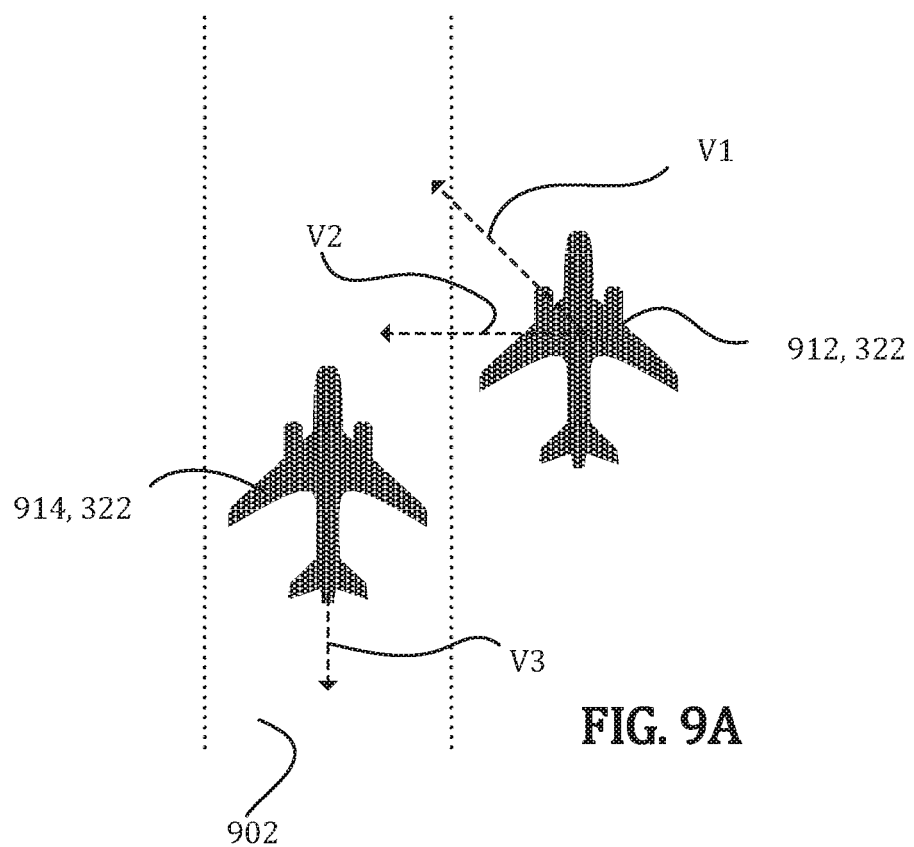
FIGS. 9A and 9B schematically depict aircraft routing.
Figure 9B:
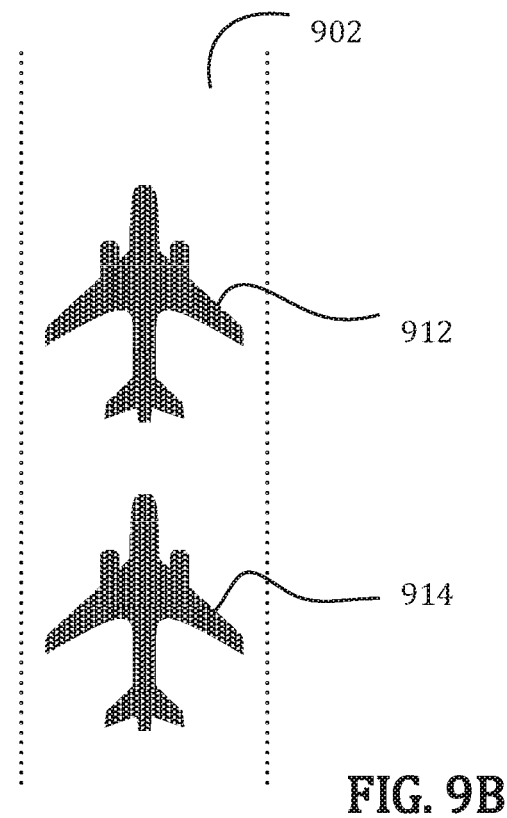

Referring to FIG. 9A, first aircraft 912 is outside flight lane 902 and second aircraft 914 is within flight lane 902. First and second aircraft 912, 914 are traveling at the same speed in the same forward direction and at the same altitude. To occupy flight lane 902 as shown in FIG. 9B, first aircraft 912 may accelerate along vector V1 while second aircraft 914 maintains velocity. Alternatively, first aircraft 912 may accelerate along vector V2 while second aircraft 914 accelerates along vector V3 (i.e., decelerates). First and second aircraft 912, 914, 322 may each be configured to perform activities in blockchain 200.

Figure 10:
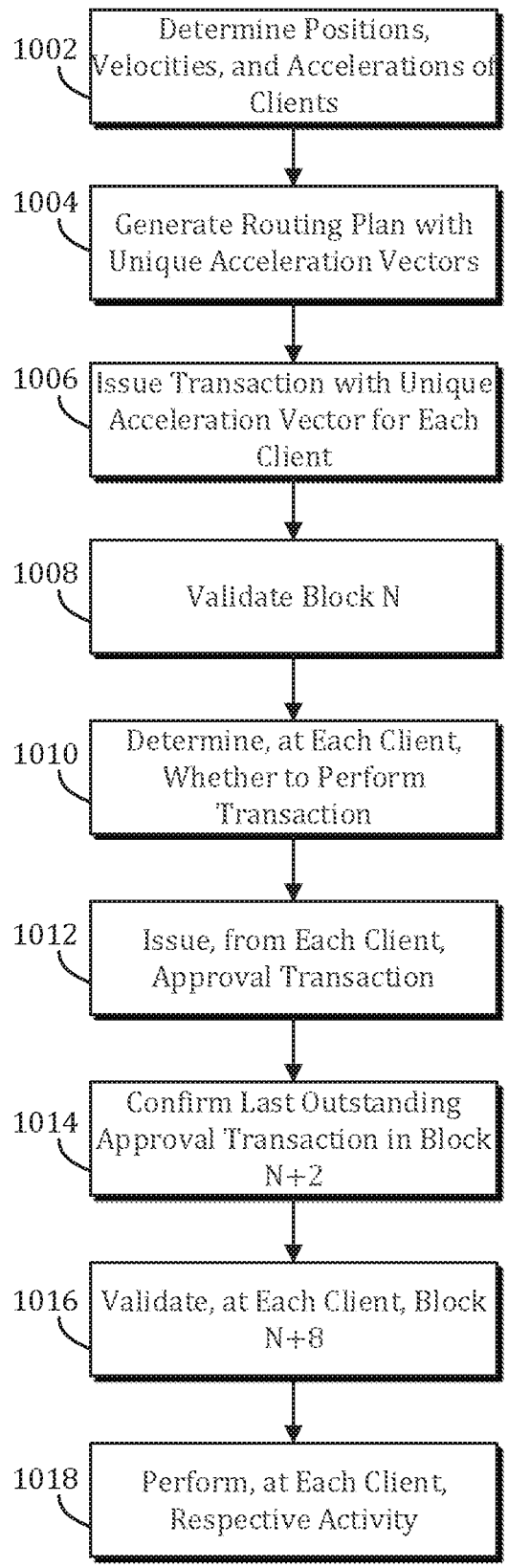
FIG. 10 is a diagram of an exemplary method of updating and using the blockchain.

A host 312 may determine that coordinated movement along vectors V2 and V3 is more fuel efficient than acceleration along V1. Referring to FIG. 10, host 922 may issue Transactions (N, n) and (N, n+1). Transaction (N, n) may instruct first aircraft 912 (the target) to accelerate along vector V2 (the activity) at [45 seconds+origination time (Block X), only if Block X+6 has been validated], where Block X is the block approving the final outstanding condition precedent and Block X+6 is the sixth block thereafter. Transaction (N, n+1) may include the same terms for second aircraft 914. Both Transactions (N, n) and (N, n+1) may lack conditions precedent.

Being nonexistent, the final outstanding condition precedent is considered to be validated simultaneous with Block N at time T (i.e., Block N is Block X). First aircraft 912 validates Block N+6 at time T+30 seconds. Second aircraft 914 validates Block N+6 at time T+32 seconds. At time T+45 seconds, first aircraft 912 accelerates along vector V2 while second aircraft 914 accelerates along vector V3.

Referring to FIG. 10, and at box 1002, a host 312 may determine the positions, velocity vectors, and acceleration vectors of a plurality of clients 322 (e.g., cars, airplanes, ships). The clients may be traveling to the same destination and/or along the same route such that route coordination is desirable. According to some embodiments, the positions, velocity vectors, and acceleration vectors are listed within transactions in blockchain 200, which host 312 validates, then analyzes.

At box 1004, host 312 may determine a routing plan that optimizes one or more variables (e.g., is the most fuel efficient, is the fastest, etc.). The routing plan may include a unique acceleration vector for each client 322.

At box 1006, host 312 may issue a transaction (eventually confirmed as Transaction (N, n)). The payload of the transaction may include a unique acceleration vector (activities) for each client 322 (targets). Conditions precedent may include any conditions precedent discussed herein (e.g., approval from each target).

According to one example, the performance time for Transaction (N, n) is: [0.1 seconds+origination time(Block X), only if Block X+3 has been subsequently validated], where Block X is the block approving the final outstanding condition precedent and Block X+6 is the sixth block thereafter. Host 312 may originate Block N (i.e., find a solution) at time T.

At box 1008, each client 322 may receive and validate Block N. At box 1010, each client 322 may determine whether performing its respective activity is possible (e.g., will not result in a collision). At box 1012, each client 322 may issue a transaction immediately approving Transaction (N, n) with no conditions precedent. At box 1014, a host may confirm last outstanding approval transaction in Block N+2, which may originate at time T+0.01. At box 1016, clients 322 may validate Block N+8 between at time T+0.06±0.003.

At box 1018, and at time T+0.1, each client 322 may simultaneously accelerate according to its respective acceleration vector.

Transaction (N, n) may include a plurality of time-dependent acceleration vectors for each client 322. For example, a first acceleration vector for first client 322A may begin at time T+0.01 and a second acceleration vector for first client 322 may begin at time T+0.013.

Instead of listing acceleration vectors, the Transaction (N, n) may include a unique time-series of desired coordinates for each client 322. For example, Transaction (N, n) may instruct first client 322A to reach point (X1, Y1, Z1) at time T+0.2, point (X2, Y2, Z2) at time T+0.3, point (X3, Y3, Z3) at time T+0.4, etc. First client 322A may accelerate as needed to occupy the specified points at the specified times.

Each feature of blockchain 200 disclosed may be integrated into a single embodiment of blockchain 200. Put differently, the features discussed with reference to any of FIGS. 2-10 may be integrated into a common embodiment of blockchain 200.

Figure 11:
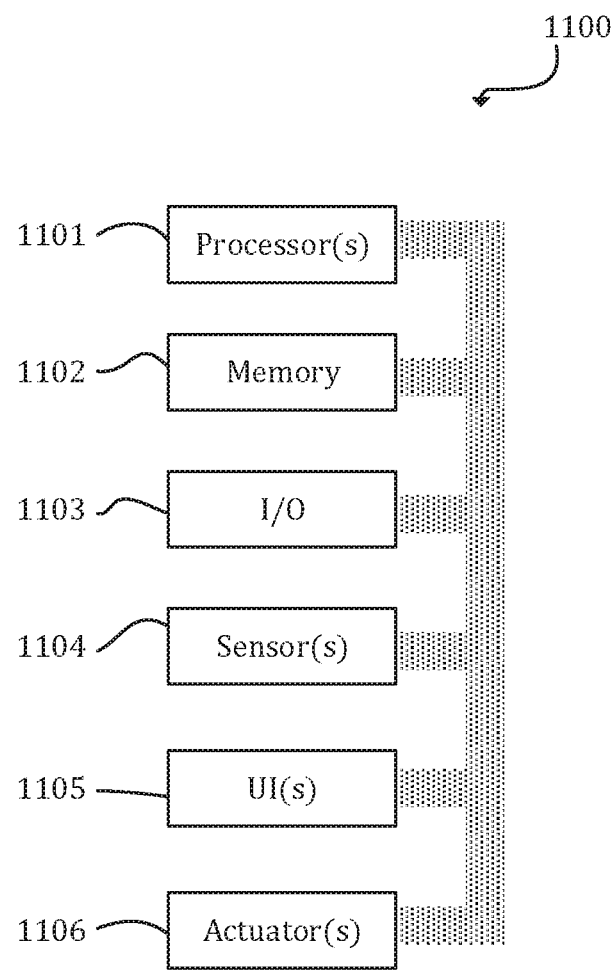
FIG. 11 schematically depicts an exemplary processing system.

Each device disclosed herein (e.g., each host 312 and client 322) may include a respective processing system ("PS"). Referring to FIG. 11, representative processing system 1100 may include one or more processors 1101, memory 1102, one or more input/output devices 1103, one or more sensors 1104, one or more user interfaces 1105, and one or more actuators 1106.

Processors 1101 may include one or more distinct processors, each having one or more cores. Each of the distinct processors may have the same or different structure. Processors 1101 may include one or more central processing units (CPUs), one or more graphics processing units (GPUs), circuitry (e.g., application specific integrated circuits (ASICs)), digital signal processors (DSPs), and the like. Processors 1101 may be mounted on a common substrate or to different substrates.

Processors 1101 are configured to perform a certain function, method, or operation at least when one of the one or more of the distinct processors is capable of executing code, stored on memory 1102 embodying the function, method, or operation. Processors 1101 may be configured to perform any and all functions, methods, and operations disclosed herein.

For example, when the present disclosure states that processing system 1100 performs/may perform task "X", such a statement conveys that processing system 1100 may be configured to perform task "X". Similarly, when the present disclosure states that a device (e.g., a host 312 or client 322) performs/may perform task "X", such a statement conveys that the processing system 1100 of the respective may be configured to perform task "X". Processing system 1100 is configured to perform a function, method, or operation at least when processors 1101 are configured to do the same.

Memory 1102 may include volatile memory, non-volatile memory, and any other medium capable of storing data. Each of the volatile memory, non-volatile memory, and any other type of memory may include multiple different memory devices, located at multiple distinct locations and each having a different structure. Examples of memory 1102 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that may be used to store program code in the form of instructions or data structures, and the like. Any and all of the methods, functions, and operations described in the present application may be fully embodied in the form of tangible and/or non-transitory machine-readable code saved in memory 1102.

Input-output devices 1103 may include any component for trafficking data such as ports, antennas (i.e., transceivers), printed conductive paths, and the like. Input-output devices 1103 may enable wired communication via USB®, DisplayPort®, HDMI®, Ethernet, and the like. Input-output devices 1103 may enable electronic, optical, magnetic, and holographic, communication with suitable memory 1103. Input-output devices 1103 may enable wireless communication via WiFi®, Bluetooth®, cellular (e.g., LTE®, CDMA®, GSM®, WiMax®, NFC®), GPS, and the like. Input-output devices 1103 may include wired and/or wireless communication pathways.

Sensors 1104 may capture physical measurements of environment and report the same to processors 1101. Examples of sensors 1104 include speed and acceleration sensors. User interface 1105 may include displays (e.g., LED touchscreens (e.g., OLED touchscreens), physical buttons, speakers, microphones, keyboards, and the like. Actuators 1106 may enable processors 1101 to control mechanical forces. For example, actuators may be electronically controllable motors, valves, etc.

processing system 1100 may be distributed. For example, some elements of processing system 1100 may be disposed inside an aircraft body while other elements of processing system 1100 may be disposed in a turbofan engine 100. Processing system 1100 may have a modular design where certain features have a plurality of the aspects shown in FIG. 11. For example, I/O modules may include volatile memory and one or more processors.

The present application discloses illustrative (i.e., example) embodiments. The claimed inventions are not limited to the illustrative embodiments. Therefore, many implementations of the claims will be different than the illustrative embodiments. Various modifications may be made to the claimed inventions without departing from the spirit and scope of the disclosure. The claims are intended to cover implementations with such modifications.

At times, the present application uses directional terms (e.g., front, back, top, bottom, left, right, etc.) to give the reader context when viewing the Figures. The claimed inventions, however, are not limited to the orientations shown in the Figures. Any absolute term (e.g., high, low, etc.) may be understood and disclosing a corresponding relative term (e.g., higher, lower, etc.).

What is claimed is:

1. A vehicle control method comprising, via a processing system comprising one or more processors:
    receiving a first blockchain update comprising a first transaction with instructions to perform an engine startup or shutdown of an aircraft;
    validating the first blockchain update;
    performing the engine startup or shutdown based on validating the first blockchain update and confirming that the aircraft is grounded and at rest.

2. The method of claim 1 comprising performing the engine startup or shutdown based on validating a predetermined number of second blockchain updates subsequent to the first blockchain update.

3. The method of claim 1 comprising after validating the first blockchain update, delaying performance of the engine startup or shutdown at least until a predetermined number of subsequent blockchain updates have been validated.

4. A vehicle control method comprising, via a processing system comprising one or more processors:

receiving a first blockchain update comprising a first transaction with instructions to perform an engine startup or shutdown;

validating the first blockchain update;

after validating the first blockchain update, delaying performance of the engine startup or shutdown at least until validating a subsequent blockchain update comprising a second transaction with instructions to perform the engine startup or shutdown.

5. The method of claim 4 wherein the instructions to perform the engine startup or shutdown in the second transaction are structured as an approval of the first transaction.

6. The method of claim 1, comprising, after validating the first blockchain update, determining whether an author of the first transaction is authorized to issue the instructions to perform the engine startup or shutdown.

7. The method of claim 1, wherein first blockchain update is an addition of a first block to a blockchain.

8. The method of claim 1, wherein the first block comprises a first tag, the first tag being a function of every block in the blockchain preceding the first block.

9. The method of claim 1, comprising confirming that the aircraft is grounded and at rest by referencing one or more second transactions contained in one or more second blockchain updates.

10. An aircraft comprising: a processing system comprising a processor, the processor executable with instructions stored in a non-transitory memory to cause the processing system to:

receive a first blockchain update comprising a first transaction with instructions to modify an operating state of an engine of an aircraft;

validate the first blockchain update;

modify the operating state of the engine based on validating the first blockchain update; and perform the engine startup or shutdown based on validating the first blockchain update and confirming that the aircraft is grounded and at rest.

11. The aircraft of claim 10, wherein the processor is further executable to cause the processing system to modify the operating state of the engine based on validating a predetermined number of second blockchain updates subsequent to the first blockchain update.

12. The aircraft of claim 10, wherein the first transaction comprises instructions to immediately modify the engine operating state and the processor is further executable to cause the processing system to:

after validating the first blockchain update, delay modifying the operating state of the engine at least until a predetermined number of subsequent blockchain updates have been validated.

13. An aircraft comprising: a processing system comprising a processor, the processor executable with instructions stored in a non-transitory memory to cause the processing system to:

receive a first blockchain update comprising a first transaction with instructions to modify an operating state of an engine;

validating the first blockchain update;

modifying the operating state of the engine based on validating the first blockchain update, wherein the processor is further executable to cause the processing system to: after validating the first blockchain update, delay modifying the operating state of the engine at least until validating a subsequent blockchain update comprising a second transaction with instructions to perform the engine startup or shutdown.

14. The aircraft of claim 13, wherein the instructions to perform the engine startup or shutdown in the second transaction are structured as an approval of the first transaction.

15. The aircraft of claim 10, wherein the engine is an electric motor or an internal-combustion engine.

16. The aircraft of claim 10, wherein the processor is further executable to cause the processing system to confirm that the aircraft is grounded and at rest by referencing one or more second transactions contained in one or more second blockchain updates.

17. A vehicle control method comprising, via a processing system comprising one or more processors:

receiving a first blockchain update comprising a first transaction with instructions to modifying an operating state of an engine to startup or shutdown the engine;

validating the first blockchain update;

modifying the engine operating state based on validating the first blockchain update and validating a predetermined number of second blockchain updates subsequent to the first blockchain update, wherein at least one of the second blockchain updates includes instructions to perform the engine startup or shutdown.

18. The method of claim 17 wherein modifying the engine operating state comprises closing a fuel valve, which terminates fuel flow into the engine.

19. The method of claim 17, wherein an aircraft comprises the engine and the method comprises confirming that the aircraft is grounded and at rest before modifying the engine operating state.

* * * * *